United States Patent [19]

Harlow

[11] Patent Number: 4,766,695
[45] Date of Patent: Aug. 30, 1988

[54] TREE BANDING ARTICLE TO PROTECT AGAINST GYPSY MOTH LARVAE

[76] Inventor: David A. Harlow, 2880 Stop Eight Road, Apt. 12, Dayton, Ohio 45414

[21] Appl. No.: 549,058

[22] Filed: Nov. 7, 1983

[51] Int. Cl.⁴ ............................................. A01G 17/12
[52] U.S. Cl. ..................................... 47/24; 106/15.05; 424/411
[58] Field of Search ........................ 47/24, 81, 23, 25; 106/15.05; 424/16, 17

[56] References Cited

U.S. PATENT DOCUMENTS

| | | | |
|---|---|---|---|
| 569,083 | 10/1896 | Belknap . | |
| 1,528,663 | 3/1925 | Fernandes, Jr. | 47/24 |
| 2,143,043 | 1/1939 | Wexler | 47/24 |
| 2,170,822 | 8/1939 | Kirpatrick . | |
| 2,389,870 | 11/1945 | Reevely . | |
| 2,593,781 | 4/1952 | Meis . | |
| 2,947,111 | 8/1960 | Zobrist . | |
| 3,333,361 | 8/1967 | Manak . | |
| 3,857,934 | 12/1974 | Bernstein et al. | 47/24 |
| 4,041,641 | 8/1977 | Dietz | 47/81 |
| 4,056,610 | 11/1977 | Barber, Jr. et al. | 424/16 |
| 4,223,007 | 9/1980 | Spence et al. | 424/16 |
| 4,244,156 | 1/1981 | Watts, Jr. | 47/23 |
| 4,297,137 | 10/1981 | Sachetto et al. | 106/15.05 |

OTHER PUBLICATIONS

"Gypsy invaders seize new ground in their war against our trees", Jackson, Donald Dale, *Smithsonian Magazine*, May 1984, pp. 47–55.
"What You Can Do To Control Gypsy Moths" by Louis M. Vasvary *Popular Mechanics*, Mar. 1982, pp. 178 and 180.

Primary Examiner—Richard J. Johnson
Attorney, Agent, or Firm—Killworth, Gottman Hagan & Schaeff

[57] ABSTRACT

A tree banding article is disclosed to protect tree foliage from crawling insects such as gypsy moth larvae. The banding article is a flexible polymeric film, such polyethylene film bearing an adhesive or elastomeric material layer on the surface in contact with the tree and a coating on the exterior surface which contains a material toxic to gypsy moth larvae.

4 Claims, 4 Drawing Sheets

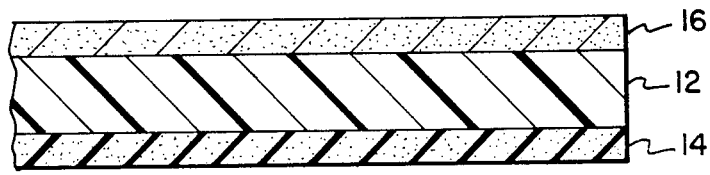
FIG-1
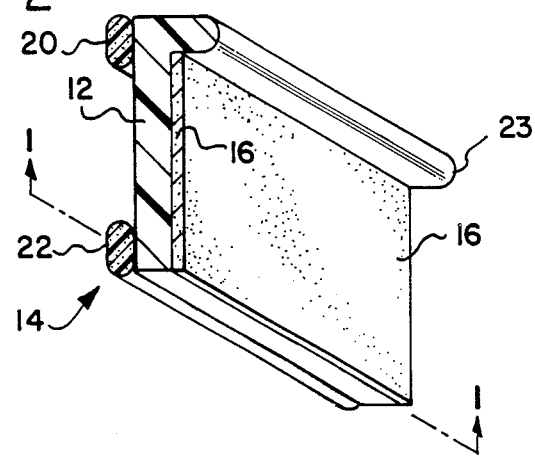
FIG-2
FIG-3
FIG-4
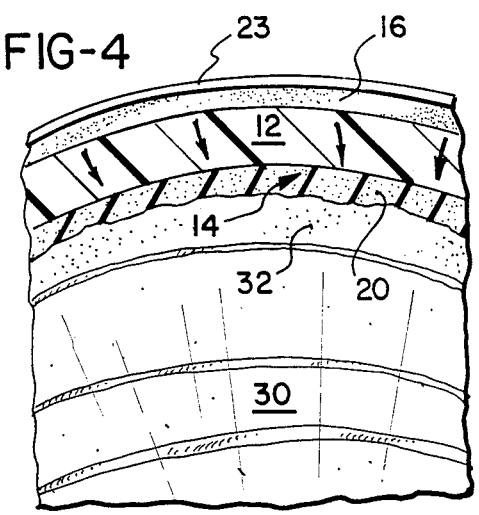
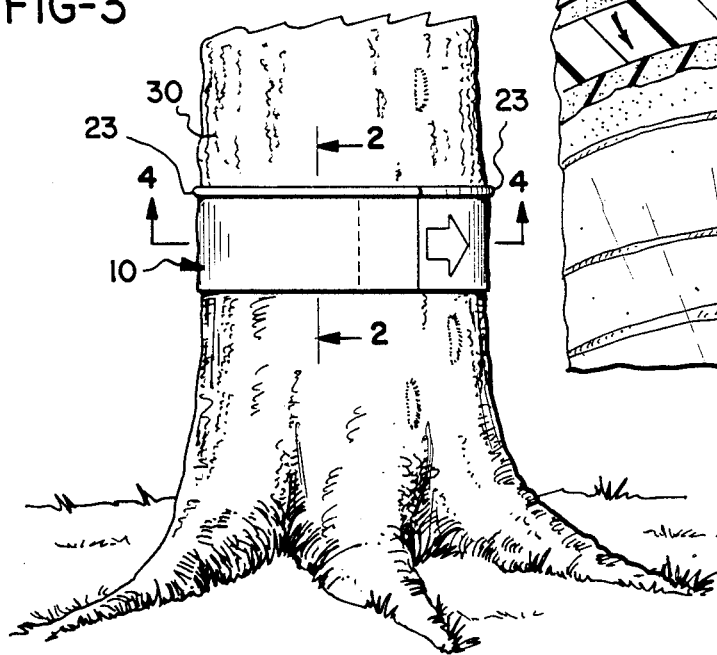

TREE BANDING ARTICLE TO PROTECT AGAINST GYPSY MOTH LARVAE

BACKGROUND OF THE INVENTION

Gypsy moth larvae are a serious pest which feed on the foliage of deciduous and coniferous trees. When an infestation is heavy, the larvae can kill mature shade trees. In forest areas, control of the gypsy moth larvae is effected by aerial spraying of large forest areas with suitable known toxicants.

The life cycle and the feeding habits of the gypsy moth larvae are such that it is difficult for property owners to protect large individual trees from gypsy moth larvae. The larvae crawl to the foliage near the top of the tree and consume foliage from the top limbs to the lower limbs. As readily recognized, relatively few property owners have equipment with the capability of spraying toxicants over the bulk of a tree's foliage, particularly the topmost foliage.

The gypsy moth eggs are laid at various places throughout infected wooded areas. Many of the larvae hatch from eggs which have fallen to the ground near trees that will be subsequently attacked. In other instances, young larvae are blown from trees by the wind and find themselves on the ground. Such larvae then crawl up the trunk of the tree and begin consuming the foliage. In addition, in later larvae stages, daily migration up and down the tree trunk may take place presumably to avoid the heat of the day.

It is recognized, of course, that painting or otherwise applying a toxicant about the circumference of a tree's trunk will kill substantial numbers of the larvae which attempt to climb the trunk. Unfortunately, the application of the toxicant to the tree trunk is a distasteful job. Moreover, unless the toxicant is carefully applied around the entire circumference of the tree trunk, the treatment is not as effective as desired. Finally, such a topical application is not long-lasting since the toxicant is easily washed away during rainfall. In addition, oil-based materials should be avoided so as to not damage the tree itself.

Accordingly, there is a need in the art to provide a convenient, long-lasting gypsy moth larvae control system that can be employed by property owners to protect individual trees.

SUMMARY OF THE INVENTION

The present invention provides an article of manufacture which can be employed conveniently for effectively protecting individual trees from the attack of gypsy moth larvae and like crawling insects. The article of the invention, sometimes hereinafter referred to as a banding material or banding article, consists essentially of an elongated, relatively wide strip of flexible polymeric film bearing on one surface a band (or bands) of tacky adhesive or elastomeric material which holds well to tree bark and bearing on the other surface a functional coating of a toxicant for gypsy moth larvae. The article is employed by wrapping a section of the tree trunk with the banding article as above-described with the adhesive or elastomeric layer of the article being placed in contact with the trunk. As thus applied, any gypsy moth larvae or like crawling insects attempting to climb up the tree must cross the exposed surface of the banding material and come into direct physical contact with the toxicant present in the exposed surface.

BRIEF DESCRIPTION OF THE DRAWINGS

FIG. 1 is a cross-sectional view of a length of the banding material of the invention along lines 1—1 of FIG. 2.

FIG. 2 is a perspective/sectional view across the width of the banding of material of the invention.

FIG. 3 illustrates one manner in which the banding material of the invention can be wrapped tightly about a tree trunk and illustrates the generation of forces which urge the adhesive or elastomeric layer of the banding material against the tree trunk.

FIG. 4 is a perspective/sectional view taken through line 4—4 of FIG. 3, looking up the tree.

DETAILED DESCRIPTION OF THE INVENTION

The flexible polymeric film employed in the tree banding article of the invention will be fabricated from a polymer which has good resistance to environmental elements such as oxygen, moisture, and ultraviolet light. Film fabricated from vinyl polymers or low-density ethlyene polymers is well-suited for this purpose, although obviously many other polymers can be employed which have the requisite properties described above. The flexible film preferably will have anti-oxidants and UV stabilizers incorporated therein. The film also preferably will have carbon black, titanium dioxide, or other pigments dispersed therein to minimize the deleterious effect of UV light on the film. The film should be relatively wide, e.g. at least 2 inches and preferably at least 4 inches wide, to provide an extended contact with the relatively slow crawling larvae. The film should be relatively heavy to stand rough handling without damage.

The adhesive or elastomeric layer applied to the one surface of the flexible polymeric film will be selected to provide a number of properties required in the tree banding article of the invention. Of prime importance, the adhesive should have good bonding or non-slip properties relative to the bark of the tree to be protected and, of course, adhere to the flexible polymeric film. In addition, the adhesive or elastomeric material should exhibit at least a moderate level of plastic flow so that when it is pressed against the surface of the tree trunk it will flow into the interstices of the surface of the tree trunk. Finally, the adhesive or elastomeric material should be formulated from materials which do not deteriorate significantly upon long-term exposure to environmental factors including low winter temperatures, high summer temperatures, oxygen, UV light, moisture, and the like. Many of the better caulking and glazing products including acrylic resins, silicone rubbers, polyethylene-polysulfide elastomers, and butyl rubbers are well-suited for this purpose. Butyl rubbers, available from Protective Treatments, Inc., of Dayton, Ohio, and many other sources, are presently preferred based upon a consideration of their having a favorable balance of properties required in the article of the invention. Scores of suitable adhesives or elastomeric materials are available from commercial sources and other formulations can be readily obtained from custom adhesive formulators which will meet the requirements of the invention as set forth above.

While the adhesive or elastomeric material has been referred to as a "layer", it should be apparent that this term is not limited to an overall, continuous layer of material on one side of the polymeric film, but is meant to include a series of strips of adhesive or elastomeric material or a pattern of spots of adhesive or elastomeric material. Actually, two strips or bands of butyl rubber backing are preferred.

The toxicant will be applied to the second surface of the flexible polymeric film by any suitable method. Depending on the polymeric film used, it may be even impregnated into the pores of the polymeric film for slow release thereof. However, it presently is preferred to disperse the toxicant in a suitable matrix which then is coated onto the flexible polymeric film. The matrix preferably is a somewhat tacky polymeric material which bonds well to the polymeric film. Resinous and oil-based stickers, and even molasses, may be used as the matrix carrier for the toxicant.

The toxicant employed in the invention can be either a chemical insecticide known to have a toxic effect on gypsy moth larvae or certain living, biologically active materials known to have the desirable effect not only of killing the larvae which directly contact the material, but which also spread to other larvae by natural forces. While scores of suitable chemical insecticides are known to be effective against the gypsy moth larvae, it is preferred to employ insecticides which have received governmental (EPA) approvals for use in controlling gypsy moths. Effective approved chemical insecticides include sevin, methoxychlor and pyrethroids. The preferred biological type toxicant for use is the wilt disease virus such as *Lymantria dispar* nuclear polyhedrosis virus (NPV). A second biological agent suitable for use is the *Bacillus thuringiensis* (B.t.).

For a number of reasons, biological agents of the type described above are ideally suited for use in the present invention. Specifically, such agents have low vapor pressures and are retained in the matrix over extended periods of time. In addition, the larvae which come into contact with such biological agents spread the agent through natural factors throughout an entire colony of larvae, including those which have infested the tree by means other than crawling up the trunk.

This permits effective treatment of a wooded area with only partial tree banding of selected, spot trees. The major shortcoming of the biological agents is that in some instances they require a number of days to kill the larvae. To overcome this shortcoming of the biological agents, it is preferred to include in the exterior functional coating a mixture of both a biological agent and a chemical insecticide such as sevin or methoxychlor to effect a quick kill of a substantial percentage of the larvae. By employing such mixtures of toxicants, it is possible to obtain a reasonable balance between a quick kill effect and a longer acting slow kill effect, of a contaminating virus.

The banding article of the invention can be fabricated by techniques known in the art, including coating or laminating the adhesive or elastomeric material layer (continuous layer, strips, or patterned spots) onto one side of the polymeric film. Depending upon the particular polymer employed to fabricate the flexible polymeric film and the particular adhesive or elastomeric material to be located on one surface thereof, such bi-layered structures can be prepared by coextrusion techniques. The laminate thus prepared then can be coated with the functional coating containing the toxicant by any of multiple techniques known in the art.

Referring to FIG. 1 of the drawings, the banding article of the invention designated as 10 includes a central lamina 12 consisting of a flexible polymeric film such as vinyl polymer, an adhesive lamina 14 preferably fabricated from strips of butyl rubber, and a surface lamina 16 which is the functional coating layer and preferably consisting of one or more toxicants dispersed in a matrix material such as molasses or a commercial sticker. As shown in FIG. 2, lamina 14 may be two strips 20-22 of butyl rubber. Also shown in FIG. 2, central polymer lamina 12 may have a raised lip 23 (which is shown in exaggerated form) to help retain surface lamina 16 on lamina 12. Thus, in use, raised lip 23 is placed at the upward edge of the banding article (see FIG. 3). As such, it acts as a rain shield/diverter to minimize the wash-away effect of rainwater running down the tree trunk.

The overall thickness of banding article 10 is preferrably $\frac{1}{8}$-$\frac{1}{4}$ inch thick, and the layers may vary in their relative sizes. That is adhesive lamina 14 may be relatively thicker than central polymer lamina 12, or vice-versa.

A preferred method for applying the banding article to protect a tree is illustrated in FIGS. 3 and 4. An end of the banding article 10 is secured to the trunk 30 of the tree to be protected by the adhesive force of adhesive lamina 14. Alternatively, separate fasteners such as nails or staples may be used, but these are not preferred since they tend to damage the tree. The banding article 10 is wrapped about the trunk so as to overlap the original end of the banding article 10. The adhesive bond between adhesive lamina 14 and the exposed surface of banding article 10, along with its adherence to the tree bark, should hold the overlapped banding article in place. If not, separate fasteners such as nails or staples may be used for that purpose, but as mentioned they are not preferred. The banding article is preferably stretched tight in being wrapped about the trunk with the direction of the applied stretching force being indicated by the arrows in FIG. 3. The effect of applying the stretching force in banding the tree is best seen in FIG. 4. Thus, adhesive lamina 14 which is relatively soft, is forced against bark layer 32 of the tree trunk 30. It thereby flows somewhat into the interstices of bark layer 32 to form a good bond with tree trunk 30. In addition, this action minimizes the possibility that crawling insects will avoid contact with the toxic surface layer 16 by crawling through any small gaps which might otherwise be present between surface layer 14 of the banding article 10 and the bark 32 of the tree trunk.

While the article and process herein described constitute preferred embodiments, it is to be understood that the invention is not limited to this precise article and process, and that changes may be made therein without departing from the scope of the invention which is defined in the appended claims.

What is claimed is:

1. An article comprising a band for protecting trees from gypsy moth larvae and like crawling insects which consists essentially of an elongated, relatively wide strip of flexible vinyl polymeric film, having a raised lip at one edge thereof and bearing on one surface strips of butyl rubber which hold well to tree bark and in close, firm contact therewith, and bearing on the surface a functional coating in the form of a matrix having a toxicant for gypsy moth larvae dispersed therein such that in use any crawling insects attempting to climb the tree must cross the exposed surface of said functional coating and come into direct physical contact with the toxicant present in said functional coating.

2. An article of claim 1 in which the functional coating includes a matrix having dispersed therein a toxicant of the group consisting of sevin, methoxychlor, pyrethroids, and viruses toxic to gypsy moth larvae.

3. An article of claim 2 in which the toxicant is a virus toxic to gypsy moth larvae.

4. An article of claim 3 in which the functional coating also includes therein a chemical toxicant.

* * * * *